United States Patent [19]
Purtell et al.

[11] Patent Number: 5,333,796
[45] Date of Patent: Aug. 2, 1994

[54] AGRICULTURAL IRRIGATION

[76] Inventors: Rufus J. Purtell; Forest M. Hoch, both of P.O. Box 1152, Brownfield, Tex. 79316

[21] Appl. No.: 156,454

[22] Filed: Nov. 23, 1993

[51] Int. Cl.$^5$ .................... A01G 25/09; B05B 15/06
[52] U.S. Cl. .................................. 239/734; 239/588
[58] Field of Search ............... 239/734, 726, 728, 743, 239/172, 588, 1

[56] References Cited

U.S. PATENT DOCUMENTS

| | | | |
|---|---|---|---|
| 2,706,133 | 4/1955 | North, Jr. et al. | 239/588 X |
| 3,533,557 | 10/1970 | Ingram et al. | 239/734 |
| 3,735,928 | 5/1973 | Watts et al. | 239/726 X |
| 4,676,438 | 6/1987 | Sesser | 239/726 X |
| 4,795,100 | 1/1989 | Purtell et al. | 239/734 |

FOREIGN PATENT DOCUMENTS 1189395  11/1985  U.S.S.R. ................ 239/734

Primary Examiner—Andres Kashnikow
Assistant Examiner—Lesley D. Morris
Attorney, Agent, or Firm—Wendell Coffee

[57] ABSTRACT

A high vibration sprinkler is hung from a movable, elongated pipe by a flexible hose. The connection of the hose to the sprinkler is by rigid, poly-vinyl chloride plastic hose barbs, tubes and fittings. The PVC connections dampen and tolerate the vibration of the sprinkler.

8 Claims, 1 Drawing Sheet

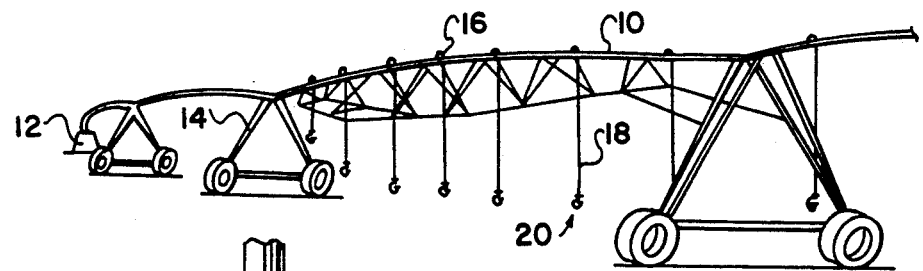
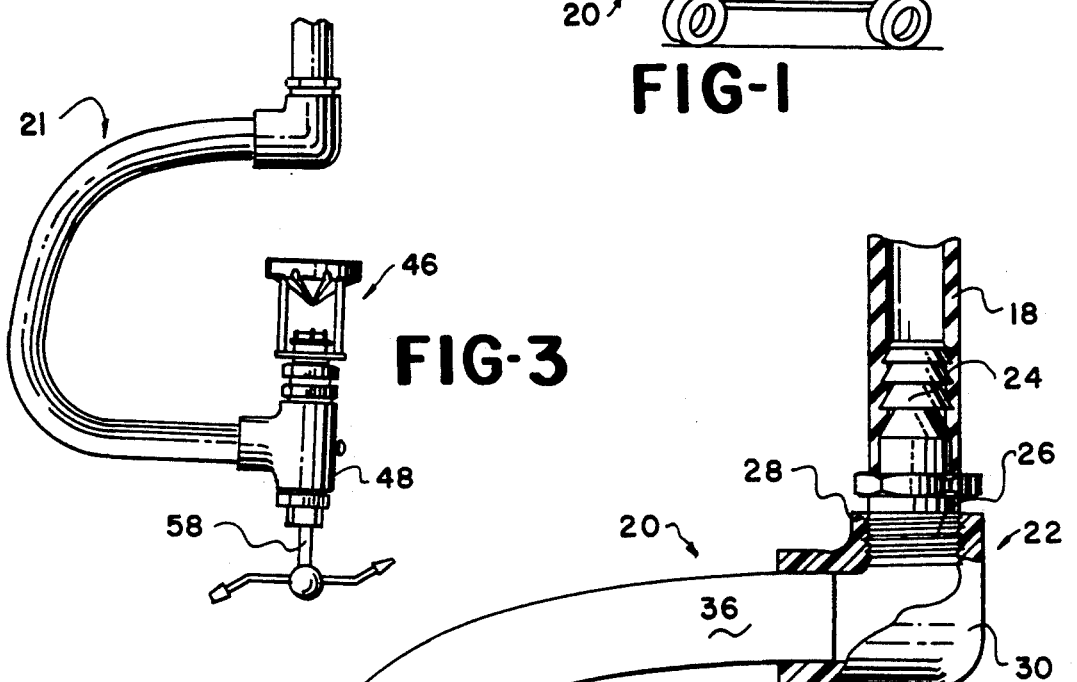
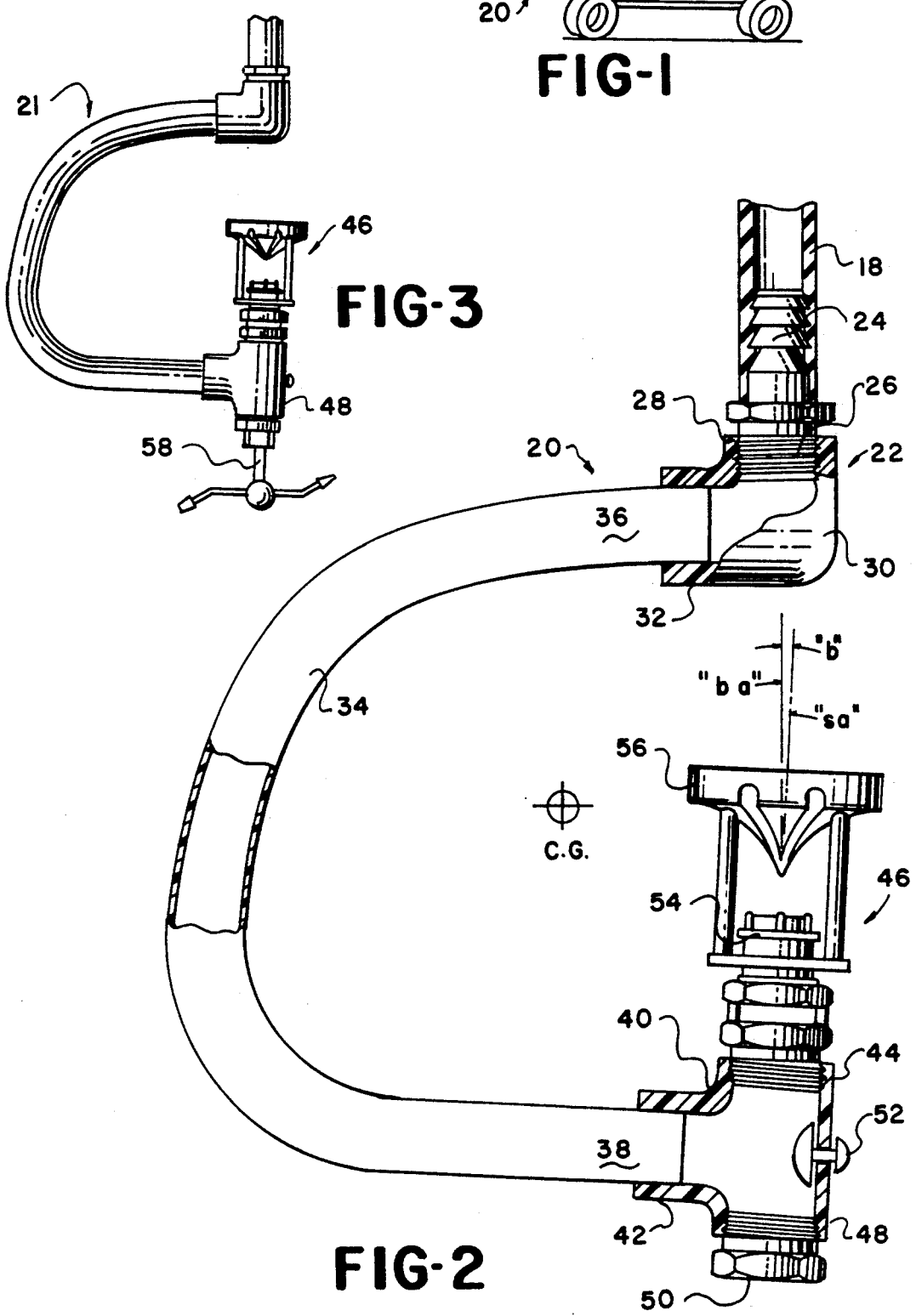

AGRICULTURAL IRRIGATION

BACKGROUND OF THE INVENTION (1) Field of the Invention

This invention relates to agricultural irrigation and more particularly to irrigation systems having elevated horizontal elongated pipes carrying water under pressure, moved by vehicles transverse to their length, with a plurality of sprinklers dispersing water therefrom. Those persons using agricultural irrigation systems of this type have ordinary skill in this art.

(2) Description of the Related Art

Agricultural systems using elevated horizontally elongated pipes carrying water under pressure supported by vehicles which move the pipes transversely of its length in dispensing water therefrom by plurality of sprinklers, are well known in the art. Many patents disclose such a type of system as well as them being commercially on the market. Systems are generally divided into two categories, one being designated as center pivot systems and the other being designated as a rectilinear system.

U.S. Pat. No. 4,795,100 (hereafter the '100 patent) issued Jan. 3, 1989 to PURTELLAND HOCH discloses a system using a high vibration sprinkler identified by the trademark "THE WOBBLER". As used herein high vibration sprinkler will be used to designate sprinklers such as "THE WOBBLER", which is manufactured by Senninger Irrigation, Inc. of Orlando, FL. The high vibration sprinklers are shown in U.S. Pat. No. DES. 253,364 issued Nov. 6, 1979. The '100 patent discloses the problems in mounting these sprinklers and the necessity of dampening the vibrations from them.

As a variation of the structure of the '100 patent, a loop mounting for the high vibration sprinkler has been used.

These loop holders include a rigid plastic tee at the top. The center connection of the tee is connected by a hose barb to the flexible depending hose. A 180° bight shaped tube extends from each of the horizontal connections of the top tee to a bottom tee. The 180° bight tubes are customarily made of PVC (Polyvinyl chloride). The bottom tee has an upward extending connection to which the high-vibration sprinkler is attached in its required upright position. Stated otherwise, the high-vibration sprinkler is placed in the middle of a 360° loop with the inlet at the top.

It is known to the art to use downward sprinklers which are mounted to hang vertically below the pipe carrying water. Each sprinkler is in an inverted or downward position. In recent years the use of such types of sprinklers has been widespread. As discussed in the issued '100 patent, the preferred vibrating sprinkler does not operate satisfactory in this position.

With center pivot systems the sprinklers along the pipe distribute different amounts of water. I.e., the sprinklers adjacent to the center pivot dispense small amounts of water, usually regulated by a small nozzle in the sprinkler. The sprinklers on the distal end distribute a much greater amount of water by using a large nozzle. It will be recognized that the area of land to be watered by each length of the elevated pipe will be proportional to the distance from the center pivot. I.e., a length of the pipe which is twice as far from the pivot as a first length of pipe must distribute twice as much water as the length close to the center pivot. Likewise a length of the pipe which was 12 times as far from the center pivot must distribute 12 times as much water as the closer length. Adjustments for different water distribution may be made by changing the nozzle size of the sprinklers and by placing the sprinklers closer together.

SUMMARY OF THE INVENTION (1) Progressive Contribution to the Art

According to this invention the sprinklers are suspended below the pipe by a flexible hose as in the '100 patent. The holder or fitting on the bottom of the hose is basically a "G-Shaped" fitting made of a thermo-setting plastic such as polyvinyl chloride (referred to herein as PVC).

The selected material is required to have vibration tolerance and dampening qualities so that the vibration of the sprinkler does not damage the holder.

Also, the sprinkler holder has been designed to have a sprinkler attached to a tee with the water entering the tee horizontally and one outlet of the tee extending vertically up and the other vertically down. A high vibration sprinkler is placed upon the upper portion of the tee. If additional water is needed for the portions of the elevated pipe near the distal end it is possible to add a downward-type sprinkler to the portion of the tee which extends vertically downward.

(2) Objects of this Invention

An object of this invention is to irrigate agricultural land.

Other objects are to irrigate agricultural land with a minimum evaporational loss of the water and with the lowest possible energy use and by application of the water to the land to prevent soil collapse and to prevent erosive runoff of the water.

Further objects are to achieve the above with devices that are sturdy, compact, durable, lightweight, simple, safe, efficient, versatile, ecologically compatible, energy conserving, and reliable, yet inexpensive and easy to manufacture, install, adjust, operate, and maintain.

Other objects are to achieve the above with a method that is rapid, versatile, ecologically compatible, energy conserving, efficient, and inexpensive, and does not require highly skilled people to install, adjust, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a perspective view somewhat schematic, of an irrigation system embodying the invention.

FIG. 2 is a sectional elevational view of an embodiment of the sprinkler holder with some parts in section.

FIG. 3 is an elevational view of a sprinkler holder with a second sprinkler attached.

As an aid to correlating the terms of the claims to the exemplary drawing(s), the following catalog of elements and steps is provided:

10 pipe
12 pivot
14 vehicles
16 tube
18 flexible hose
20 sprinkler assembly
21 sprinkler assembly 22 inlet connection
24 hose barb
28 threaded connection
28 threaded inlet
30 inlet fitting
32 outlet connection
34 rigid thermosetting plastic tube
36 top end
38 bottom end
40 rigid plastic sprinkler fitting
  42 inlet
  44 outlet
46 sprinkler
48 additional outlet
50 plug
52 automatic drain valve
54 nozzle unit
56 thimble
58 inverted sprinkler

DESCRIPTION OF THE PREFERRED EMBODIMENTS

Referring to the drawing there may be seen illustrated an irrigation system which would embody this invention.

The system has an elevated, horizontal elongated pipe 10 which is adapted to carry water under pressure. The system illustrated is a center-pivot system being designed to rotate about center pivot 12. The pipe 10 is supported by a plurality of vehicles 14 attached to the pipe. The vehicles 14 support the pipe above growing crops and also provide a means for moving the pipe transverse to its length. Outlets from the pipe are connected to U-Shaped tubes 16.

A plurality of hoses 18 and sprinkler assembly 20 are connected to the elongated pipe 10.

Those with ordinary skill in the art will recognize that the structure defined, to this point, is old and well known in the art.

Each of the hoses 18 is connected to inlet connection 22. The inlet connection includes hose barb 24 which has an axis and which is telescoped within the hose 18. The hose barb 24 also includes threaded portion 26 which is threadedly connected to threaded inlet 28 of inlet fitting 30 which is illustrated in this embodiment as an el. The hose 18 will depend vertically downward and the inlet connection 22 with its barb 24 and threaded connection 26 will be vertically oriented and aligned with the axis of the hose 18 at that point. Also the threaded inlet connection 28 will be vertically oriented and aligned with the threaded connection 26. The barb axis is shown by line "ba".

The hose barb 24 and inlet fitting 30 are constructed of a rigid thermo-setting plastic.

Outlet connection 32 of the inlet fitting 30 is horizontally oriented. Rigid thermo-setting plastic tube 34 has top end 36 connected to the outlet 32. Preferably the tube 34 is constructed of PVC plastic. The top end 36 telescopes within the connection 32 and it is a slip connection and held securely in place by adhesive.

Bottom end 38 of the tube 34 is below the top end 36. I.e., the axis of the bottom end 38 intersects the axis of the hose barb 24. The bottom end 38 of the tube 34 is connected to rigid plastic sprinkler fitting 40. It is connected to inlet 42 of the sprinkler fitting 40 by an adhesive slip connection as is slip connection 32.

The sprinkler fitting 40 has at least one outlet 44 which extends upward. The outlet 44 is a threaded connection. Sprinkler 46 is threaded into the sprinkler fitting outlet 44. The sprinkler fitting in the embodiment illustrated is in the form of a tee with additional outlet 48 extending downward and aligned with the outlet 44. As illustrated in FIG. 2, plug 50 is threaded into the threaded outlet 48. Automatic drain valve 52 is placed in the sprinkler fitting for the purpose of draining water from the sprinkler assembly 20 when there is no pressure applied to the sprinkler. Drain valves 52 are well known to the art. From the above it may be seen that the sprinkler assembly 20 is "G" shaped.

As described above the sprinkler 46 is a highvibration sprinkler. The sprinkler has a nozzle at the top of nozzle unit 54. The axis of the nozzle is shown by line "Sa". It is desirable that the nozzle or sprinkler axis "sa" be vertical. The water, under pressure, within the sprinkler 46 would impinge upon the conical director within diverter or thimble 56 causing the water to be diverted. In this diversion the thimble 56 will dance, or jitter, or vibrate, causing the high vibration which is particularly destructive of its mounting unless the vibrations are dampened or tolerated.

FIG. 3 shows a similar assembly identified as sprinkler assembly 21. It will be noted that this sprinkler assembly is identical to assembly 20 except that the plug 50 has been removed and inverted sprinkler 58 threaded into the bottom additional outlet 48. As explained above this is to permit an assembly so that additional water may be dispersed from the sprinkler assembly.

The sprinkler fitting 40 is described as a tee, however if it was not desired to place the additional sprinkler 58 thereon, it could be made as an el.

It is important that the high vibration sprinkler 46 of the design indicated be oriented so that it is vertical in use. It will be understood, of course, that as the device is described the center of gravity "CG" of the sprinkler assembly 20 will be on one side of the barb axis "ba" and somewhere within the "G-Shaped" assembly 20.

When in use there will be water pressure within the flexible hose 18. Although the hose 18 is flexible when the hose has water under pressure therein it tends to stiffen. Even if it does not become rigid, it will certainly be stiff or less flexible than when no pressure is within the hose. The expulsion of the water from the nozzle unit 54 will have a reaction which is a force aligned with the nozzle axis "sa".

It is understood that it is desirable that the sprinkler axis "sa" be vertical. It has been described that the hose 18 will be stiff and will aid in maintaining the barb axis "ba" about vertical. The center of gravity "CG" will tend to tilt the sprinkler inasmuch as the center of gravity is to one side of the barb axis. The thrust of the expulsion of the water from the sprinkler assembly will exert a downward thrust. It has been found that it is desirable to have the sprinkler axis "sa" at a small angle "b" to the barb axis. However, inasmuch as the nozzle is aligned with the barb axis, or nearly so, this downward thrust will have a small influence in the way the sprinkler assembly hangs. The thrust of the water from the sprinkler will depend upon the volume of the water expelled and the velocity of it. Therefore, since the different sprinklers discharge different amounts of water this thrust from the water expulsion will change with different sprinklers and therefore there has been an attempt to minimize the effect of it by placing the sprinkler nozzle vertically below the barb. Experience shows that in consideration of these forces that the sprinkler axis will hang at a small angle to vertical. Therefore it is desirable that the sprinkler axis be placed at a small angle to the barb angle axis which is shown by the angle "b" in the drawing. Experience indicates that this small angle will be about 2°.

The embodiments shown and described above are only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A process for dispersing water from an irrigation system having:
   a) an elevated horizontal elongated pipe adapted to carry water under pressure,
   b) a plurality of vehicles forming means attached to said horizontal pipe for supporting said pipe above growing crops and for moving said horizontal pipe transversely of its length, and
   c) a plurality of sprinklers, each sprinkler having
      i) a sprinkler axis,
      ii) a rotatable dispersion element which vibrates excessively causing shock, said dispersion element mounted for rotation about the sprinkler axis;
   the improved method for connecting each of the sprinklers to a horizontal pipe comprising:
   d) forming a G-Shaped rigid holder from shock tolerant thermoplastic material,
   e) attaching the sprinkler to a G-shaped rigid holder,
   f) attaching the holder to a flexible hose by a hose barb having a barb axis,
   g) connecting the flexible hose to the horizontal pipe,
   h) positioning the dispersion element below the barb.

2. The process as defined in claim 1 further comprising:
   j) tilting said sprinkler axis at a small angle to the barb axis.

3. The invention as defined in claim 2 wherein said small angle is about 2°.

4. In an irrigation system having:
   a) an elevated horizontal elongated pipe adapted to carry water under pressure,
   b) vehicle means attached to said horizontal pipe for supporting said pipe above growing crops and for moving said horizontal pipe transversely of its length, and
   c) a plurality of high vibration sprinklers each having a sprinkler axis;

the improved structures for connecting each of the sprinklers to said horizontal pipe comprising:
   d) a flexible hose fluidly connected to said horizontal pipe and depending therefrom,
   e) a rigid G-shaped holder fluidly and structurally connecting said sprinkler to the hose by
   f) a hose barb having a barb axis,
   said G-shaped holder holding said sprinkler vertically below the hose barb with the sprinkler axis at a small angle to the barb axis.

5. The structure defined in claim 4 further comprising:
   h) said G-shaped holder having a center of gravity on one side of the barb axis,
   i) said sprinkler axis being at about a 2° angle away from said center of gravity.

6. In an agricultural system having
   a) an elevated horizontal elongated pipe adapted to carry water under pressure,
   b) vehicle means attached to said horizontal pipe for supporting said pipe above growing crops and for moving the horizontal pipe transversely of its length,
   c) a plurality of sprinklers,
   d) a flexible hose fluidly and structurally connected to said horizontal pipe and depending vertically therefrom,
   e) a hose barb inserted into a bottom end of the hose,
   f) a rigid plastic top fitting attached by a threaded inlet to a threaded bottom of the hose barb,
   g) the inlet and the hose barb vertically aligned with said hose,
   h) the top fitting having at least one horizontally oriented outlet,
   i) a rigid thermosetting plastic tube having a top connected by an adhesive slip joint to a outlet of the top fitting,
   j) said tube curved to have a bottom end approximately horizontal,
   k) the bottom end of the tube below the top end,
   l) a rigid plastic sprinkler fitting attached by an adhesive slip joint to the bottom end of the tube,
   m) said sprinkler fitting having at least one threaded outlet extending vertically upward,
   n) a first sprinkler attached to the vertically upward extending outlet of the sprinkler fitting, and
   o) a drain valve in said sprinkler fitting,
   p) said sprinkler fitting having a second threaded outlet extending vertically downward,
   q) a second sprinkler threadedly connected to said second outlet.

7. The structure as defined in claim 6 wherein:
   r) said top fitting is an el,
   s) said bottom fitting is a tee, and
   t) said first sprinkler is a high vibration sprinkler.

8. The structure as defined in claim 7 wherein
   u) said hose barb has an axis at a 2° angle to an axis of the vertical upward extending outlet.

* * * * *